(12) United States Patent
Kim (10) Patent No.: US 9,266,566 B2
(45) Date of Patent: Feb. 23, 2016

(54) FRONT BODY MEMBER FOR VEHICLE

(71) Applicant: Hyundai Motor Company, Seoul (KR)

(72) Inventor: Hyun Sik Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/496,851

(22) Filed: Sep. 25, 2014

(65) Prior Publication Data

US 2015/0291220 A1     Oct. 15, 2015

(30) Foreign Application Priority Data

Apr. 9, 2014   (KR) ........................ 10-2014-0042597

(51) Int. Cl.
*B62D 25/00*     (2006.01)
*B62D 25/08*     (2006.01)

(52) U.S. Cl.
CPC ................................... *B62D 25/082* (2013.01)

(58) Field of Classification Search
CPC .................................................... B62D 25/082
USPC .............. 296/187.1, 187.09, 193.09, 203.02; 293/132, 133
See application file for complete search history.

(56) References Cited

U.S. PATENT DOCUMENTS

| | | | |
|---|---|---|---|
| 8,020,906 B2 * | 9/2011 | Schmid et al. | 293/133 |
| 2008/0106107 A1 * | 5/2008 | Tan et al. | 293/133 |
| 2014/0103670 A1 * | 4/2014 | Iijima et al. | 293/133 |
| 2014/0159420 A1 * | 6/2014 | Hashimoto et al. | 296/187.1 |

FOREIGN PATENT DOCUMENTS

| | | |
|---|---|---|
| JP | 2003-276533 A | 10/2003 |
| KR | 10-2007-0020785 A | 2/2007 |
| KR | 10-2008-0045913 A | 5/2008 |
| KR | 10-1359966 B1 | 2/2014 |

* cited by examiner

*Primary Examiner* — Joseph D Pape
(74) *Attorney, Agent, or Firm* — Morgan, Lewis & Bockius LLP

(57) ABSTRACT

A front body member which transfers collision energy to a front side member, or allows collision energy to be absorbed by the front side member at a time of a vehicle collision, may include an upper portion and a lower portion with respect to a height direction of the vehicle body, in which the upper portion and the lower portion of the front body member further include an upper flange and a lower flange, respectively, which are formed along perimeters of the upper portion and the lower portion to be in surface-to-surface contact with each other, and an empty space is formed in each of the upper portion and the lower portion of the front body member for a target internal space to be formed in the front body member when the upper flange and the lower flange are in surface-to-surface contact with each other.

18 Claims, 7 Drawing Sheets

peel loading of spot-welded joint

FRONT BODY MEMBER FOR VEHICLE

CROSS-REFERENCE TO RELATED APPLICATION

The present application claims priority to Korean Patent Application No. 10-2014-0042597 filed Apr. 9, 2014, the entire contents of which is incorporated herein for all purposes by this reference.

BACKGROUND OF THE INVENTION

1. Field of the Invention

The present invention relates to a front body member for a vehicle, and more particularly, to an integrated front body member having a minimum number of parts.

2. Description of Related Art

In general, a front body member for a vehicle body is installed on a front portion of a front side member, which forms a frame of a front side of the vehicle body in a length direction of the vehicle body, in order to serve to transfer collision energy to the front side member, or allow collision energy to be absorbed by the front side member at the time of a small overlap collision.

Here, the small overlap is a term associated with a collision test, and a small overlap test is performed by a collision test department in order to recognize degrees of damage to a vehicle and injuries to persons in case a part of a front portion of a driver seat of the vehicle, that is, a left portion or a right portion at a front side of the vehicle collides with an obstacle.

Figure 1:
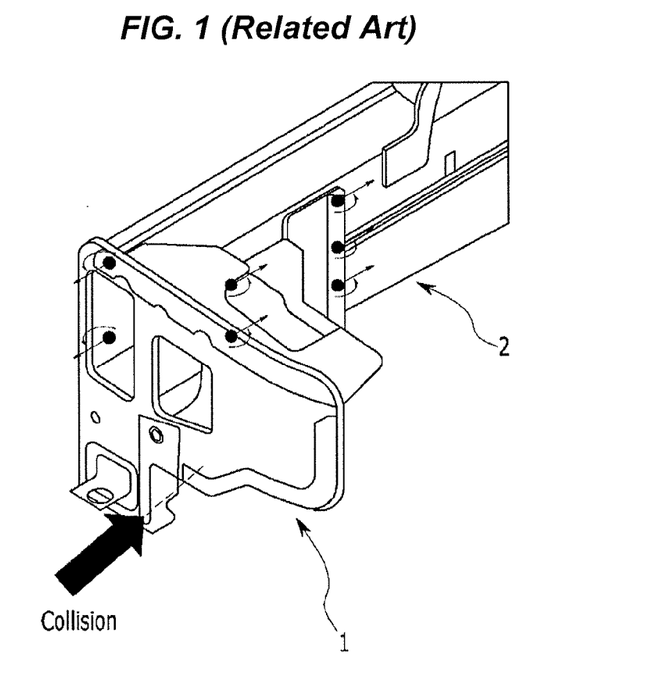
FIG. 1 is a perspective view illustrating an appearance in which a front body member in the related art is mounted on a front portion of a front side member, and a load and moment that are applied to each spot weld at the time of a collision.

FIG. 1 is a perspective view illustrating an appearance in which a front body member in the related art is mounted on a front portion of a front side member, and loads and moments that are applied to spot welds, respectively, at the time of a collision.

Referring to FIG. 1, it can be seen that by mounting the front body member 1, overlapped faces of an obstacle and a vehicle body are increased as much as a width of a front portion of the front body member 1 at the time of a small overlap collision in the arrow directions.

If the front body member 1 is not mounted, the overlapped faces of the obstacle and the vehicle body are limited to a width of a front end face of the front side member 2 at the time of a small overlap collision.

Therefore, by mounting the front body member 1, the overlapped face of the frame of the vehicle body, which may support a collision, is increased, and an ability to absorb collision energy of the vehicle body is improved because collision energy is effectively transferred to the front side member 2.

By the aforementioned configuration, a degree of damage to the vehicle or injury to a driver is decreased.

However, in case a predetermined amount or more of collision energy is generated, or there is a bad spot weld among the spot welds (black spots illustrated in FIG. 1) for engaging the front body member 1 and the front side member 2, the front body member 1 in the related art has a problem of the front body member 1 being destroyed or separated even before collision energy is transferred to the front side member 2.

The first reason of the aforementioned problem is that engaging directions of the spot welds for engaging the front side member 2 is a width direction of the vehicle body which causes the front body member 1 to be easily separated by the occurrence of a moment, and the second reason of the aforementioned problem is that because a plurality of parts is provided, once a single part becomes separated first, other parts may also be separated and moved away at one time.

The reason why the moment is generated is that collision energy, which is applied to the front body member 1 at the time of a small overlap collision, is spaced apart from the spot welds in a width direction of the vehicle body, and as a result, a peel load, which peels a welded flange, that is, a normal tension load is generated.

As can be seen from FIG. 1, since the collision energy is applied while being spaced apart from the spot welds in the width direction of the vehicle body, normal tension stress due to moment and shear stress due to a load in a collision direction are simultaneously applied to each of the spot welds.

In addition, the spot weld is particularly vulnerable to the normal tension stress, that is, the peel stress.

That is, a portion of the welded flange where the spot weld is positioned may be easily fractured.

In FIG. 1, the rectilinear arrow shown on each of the spot welds indicates a shear load due to collision energy, and the circular arc type arrow indicates moment due to collision energy.

The normal tension stress is generated on the spot weld by the moment.

Figure 2A:
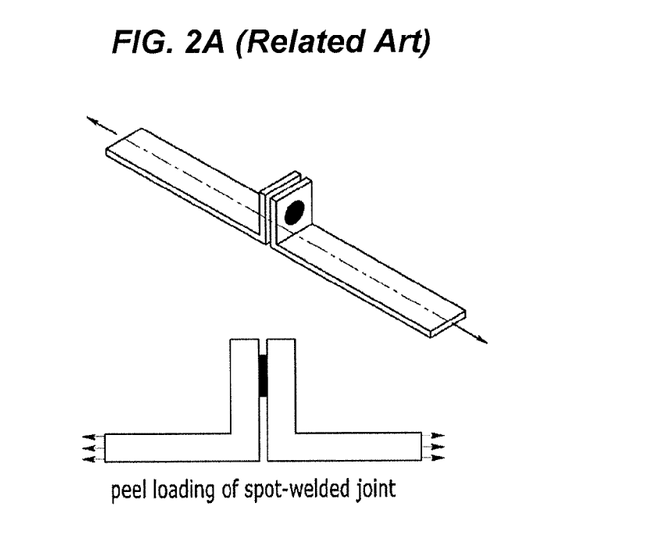
FIGS. 2A, 2B and 2C are views illustrating a comparative experimental result of weld strength in peel and weld strength in shear according to spot welding in the related art.
Figure 2B:
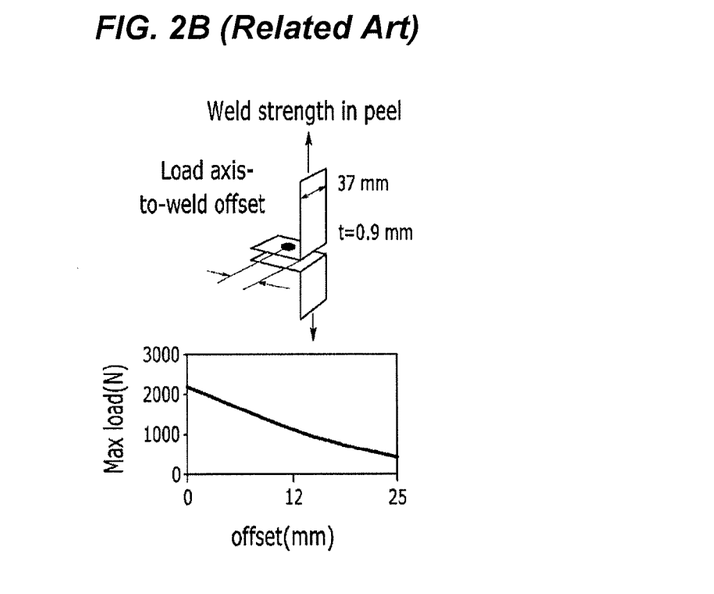
Figure 2C:
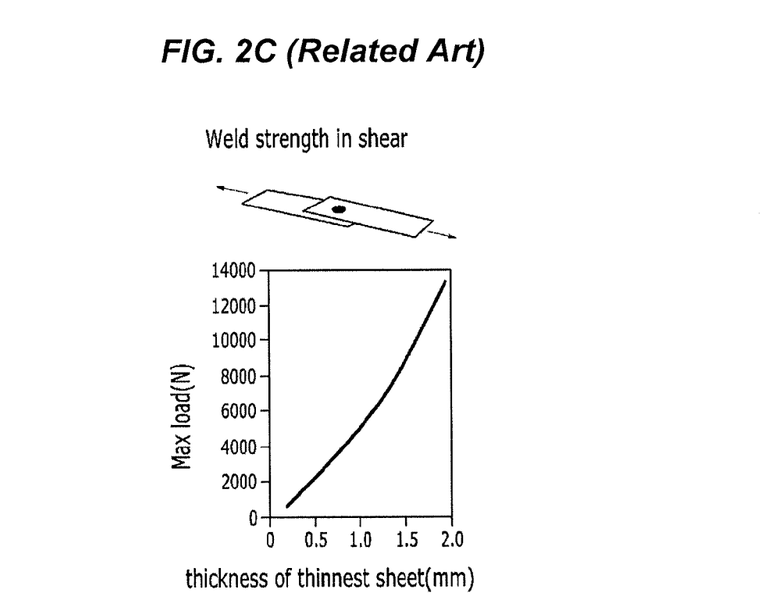

FIGS. 2A, 2B and 2C illustrate a comparative experimental result of weld strength in peel and weld strength in shear according to spot welding.

The weld strength in peel becomes weakened as load axis-to-weld offset becomes greater.

A maximum peel load is about 2100 N, and the moment, which is applied to the spot weld, becomes greater as the offset becomes greater, such that the peel stress is increased, and as a result, the maximum peel load is greatly decreased to 500 N or less when the offset is 25 mm.

In contrast, the weld strength in shear is rather greatly increased as a thickness of a thinnest sheet, which is welded, is increased. The thinnest sheet may withstand a shear load of about 2000 N when the thickness of the thinnest sheet is 0.5 mm, and the thinnest sheet may withstand a shear load of about 4000 N or more when the thickness of the thinnest sheet is 1 mm.

Therefore, in order to cope with a collision accident at which a large load is applied, when a structure of the vehicle body is designed, it is necessary to design the structure of the vehicle body so that the normal tension load is not applied to the welded flange when possible, and the shear load is mainly applied to the welded flange.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an integrated front body member, which is designed to minimize a normal tension load which is applied to spot welds and maximize a shear load at the time of a small overlap collision of a vehicle, thereby more effectively performing an operation of transferring and absorbing collision energy.

According to various aspects of the present invention, a front body member installed on a front portion of a front side member forming a frame of a front side of a vehicle body in a length direction of the vehicle body, and configured to transfer collision energy to the front side member, or allow collision energy to be absorbed by the front side member at a time of a vehicle collision, may include an upper portion and a lower portion with respect to a height direction of the vehicle body, in which the upper portion and the lower portion of the front body member further include an upper flange and a lower flange, respectively, which are formed along perimeters of the upper portion and the lower portion to be in surface-to-surface contact with each other, and an empty space is formed in each of the upper portion and the lower portion of the front body member for a target internal space to be formed in the front body member when the upper flange and the lower flange are in surface-to-surface contact with each other.

The upper portion and the lower portion of the front body member together may form an opening into which the front portion of the front side member may be inserted and an engaging inner perimeter surface on the front body member which overlaps an outer perimeter surface of the front portion of the front side member inside the opening, in a state in which the upper flange and the lower flange are in contact with each other.

Shapes of the upper portion and the lower portion of the front body member may be symmetrical to each other with respect to a contact surface of the upper flange and the lower flange.

A length of the engaging inner perimeter surface may be 70 mm or more in a length direction of the front side member.

The front body member may further include at least one bulkhead, and the bulkhead may be fixedly installed in the target internal space to serve as a reinforcement member.

The front body member of claim 5, wherein the front side member may include an outer front side member forming an outer portion of the front side member in a vehicle width direction, and an inner front side member forming an inner portion of the front side member in the vehicle width direction, in which the bulkhead is formed to divide the target internal space into two spaces in the vehicle width direction while being in contact with a front end of the outer front side member or the inner front side member.

One portion of the bulkhead which is in contact with either one of the upper portion or the lower portion of the front body member may be fixedly installed by a structural adhesive or laser welding, and another portion of the bulkhead which is in contact with the either one of the upper portion or the lower portion of the front body member that is not in contact with the one portion of the bulkhead, may be fixedly installed by spot welding.

The front body member may be integrally formed by welding the upper flange to the lower flange.

When the front body member is engaged with the front portion of the front side member, the front body member may be formed to have a parallel face which is parallel with the length direction and a height direction of the front side member, a vertical face which is perpendicular to the parallel face, a diagonal face which forms predetermined angles with respect to the parallel face and the vertical face, and upper and lower cover faces in the vehicle height direction which are perpendicular to the vertical, parallel and diagonal faces.

The diagonal face and the vertical face may be formed outside the front side member in the vehicle width direction.

The front body member may be fixedly engaged with the front side member by welding the engaging inner perimeter surface and an outer perimeter surface of the front portion of the front side member.

A plane including the opening may form an angle identical to an angle that is formed between a plane including an opened face of a front end of the front portion of the front side member and the length direction of the front side member.

An angle between the plane including the opening and the length direction of the front side member may be between +45° and +135°.

The front side member may include an upper end protruding portion or a lower end protruding portion formed respectively on an upper end surface or a lower end surface of the front side member and extending in the length direction of the front side member, and at least one of an upper engaging groove and a lower engaging groove may be formed in the vehicle length direction in the upper or lower portions respectively of the front body member so that at least one of the upper end protruding portion and the lower end protruding portion may be fitted into the at least one of the upper engaging groove and the lower engaging groove respectively when the front body member is engaged with the front portion of the front side member.

According to various aspects of the present invention, a front body member installed on a front portion of a front side member forming a frame of a front side of a vehicle body in a length direction of the vehicle body, and configured to transfer collision energy to the front side member, or allow collision energy to be absorbed by the front side member at the time of a vehicle collision, may be integrally formed to have a target internal space, in which when the front body member is engaged with the front portion of the front side member, the front body member may be formed to have a parallel face which is parallel with a length direction and a height direction of the front side member, a vertical face which is perpendicular to the parallel face, a diagonal face which forms predetermined angles with respect to the parallel face and the vertical face, and upper and lower cover faces in a vehicle height direction which are perpendicular to the vertical, parallel and diagonal faces.

The front body member may be integrally formed with an opening into which the front portion of the front side member is inserted, and an engaging inner perimeter surface which overlaps an outer perimeter surface of the front portion of the front side member inside the opening.

The front body member may further include at least one bulkhead, and the bulkhead may be integrally formed at a predetermined position in the target internal space to serve as a reinforcement member.

The front side member may include an outer front side member forming an outer portion in a vehicle width direction, and an inner front side member forming an inner portion in the vehicle width direction, in which the bulkhead may be formed to divide the target internal space into two spaces in the vehicle width direction while being in contact with a front end of the outer front side member or the inner front side member.

The diagonal face and the vertical face may be formed outside the front side member in the vehicle width direction.

The front side member may include an upper end protruding portion or a lower end protruding portion formed respectively on an upper end surface or a lower end surface of the front side member and extending in the length direction of the front side member, in which at least one of an upper engaging groove and a lower engaging groove is formed in the vehicle length direction in the upper portion or the lower portion respectively of the front body member in the vehicle height direction so that at least one of the upper end protruding portion and the lower end protruding portion is fitted into the at least one of the upper engaging groove and the lower engaging groove respectively when the front body member is engaged with the front portion of the front side member.

Strength of a material of the front body member may be equal to or greater than strength of a material of the front side member.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Throughout the specification and the claims, unless explicitly described to the contrary, the word "comprise" and variations such as "comprises" or "comprising" will be understood to imply the inclusion of stated elements but not the exclusion of any other elements.

Figure 3A:
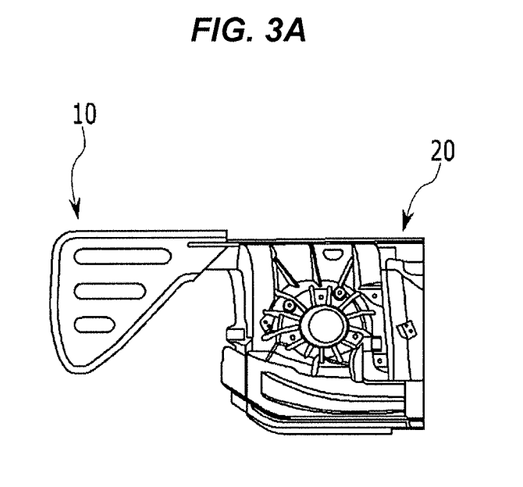
FIGS. 3A and 3B are a top plan view and a perspective view illustrating an appearance in which an exemplary front body member according to the present invention is mounted on a front side member.
Figure 3B:
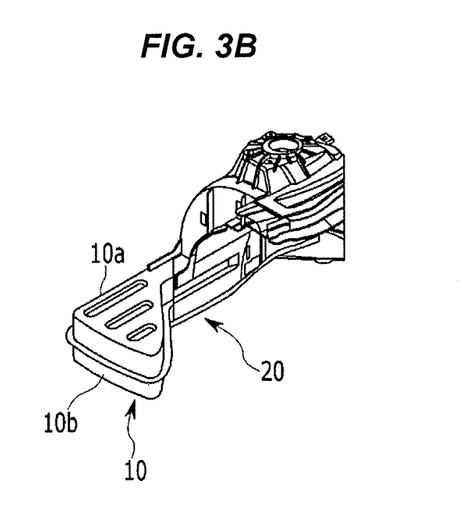

FIGS. 3A and 3B are a top plan view and a perspective view illustrating an appearance in which a front body member according to various embodiments of the present invention is mounted on a front side member 20.

Referring to FIG. 3, a front body member 10 may include an upper portion 10a and a lower portion 10b of the front body member.

The upper portion 10a and the lower portion 10b may include flanges that are formed along perimeters of the upper portion 10a and the lower portion 10b, and the upper portion 10a and the lower portion 10b may be fixedly engaged by performing spot welding in a state in which the flanges are in surface-to-surface contact with each other.

Therefore, an engaging direction of the spot welds is in a vehicle height direction instead of a vehicle width direction.

Accordingly, unlike the front body member 1 in the related art, a peel load is not applied to the welded flange, but only a shear load is applied to the welded flange.

Figure 4:
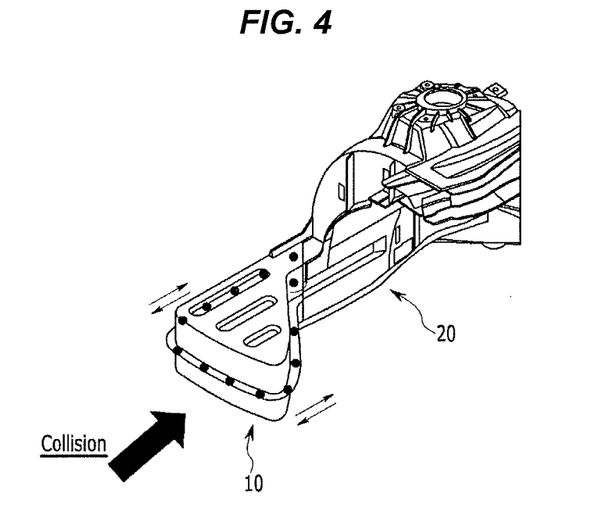
FIG. 4 is a perspective view illustrating spot welds of upper and lower flanges of the exemplary front body member according to the present invention.

FIG. 4 is a perspective view illustrating spot welds of the upper and lower flanges of the front body member according to various embodiments of the present invention.

FIG. 4 illustrates an appearance in which the flanges of the upper portion 10a and the lower portion 10b of the front body member 10 are engaged by welding such that the integrated front body member 10 is formed, and an appearance in which the shear loads are mainly applied to the spot welds indicated by black spots at the time of a small offset collision in a length direction of the vehicle body.

Referring to FIG. 4, only a second spot weld from a right upper end of a set of spot welds, is engaged in the vehicle width direction such that the peel load due to moment (arrow) may be applied thereto, and all of the remaining spot welds are engaged in the vehicle height direction such that only the shear loads are applied thereto.

Figure 5:
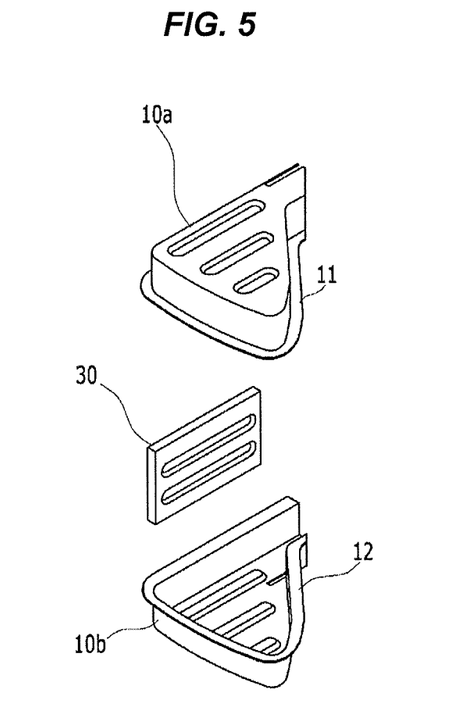
FIG. 5 is an exploded perspective view illustrating constituent elements of the exemplary front body member according to the present invention.

FIG. 5 is an exploded perspective view illustrating constituent elements of the front body member according to the present invention.

Shapes of the upper flange 11 and the lower flange 12 are clearly illustrated in FIG. 5.

The upper flange 11 and the lower flange 12 are symmetrical to each other with respect to contact surface of the flanges, and may be fixedly engaged by spot welding.

In addition, empty spaces having a predetermined shape are formed in the upper portion 10a and the lower portion 10b of the front body member, respectively.

The empty space has a shape that is planned in advance so that a predesigned internal space is formed when the front body member 10 is formed by welding the upper flange 11 and the lower flange 12.

The internal space may be designed so that the front body member 10 may have sufficient stiffness only with a low weight.

Referring to FIG. 5, the front body member 10 according to the exemplary embodiment of the present invention may further include a bulkhead 30.

The bulkhead 30 is fixedly installed in the internal space that is formed by engaging the upper portion 10a and the lower portion 10b of the front body member, and serving as a reinforcement member.

In order for the bulkhead 30 to serve as the reinforcement member, the bulkhead 30 stands in the internal space in the vehicle height direction, that is, stands vertically, and may be formed so that upper and lower edges of the bulkhead 30 are in contact with inner surfaces of the upper portion 10a and the lower portion 10b of the front body member which form the internal space.

In various embodiments as illustrated in FIG. 5, the bulkhead 30 is a reinforcement member with a rectangular shape that corresponds to a shape of a cross section of the front body member 10 in a vehicle length direction. The bulkhead 30 may additionally have a different shape depending on various other factors.

Figure 6:
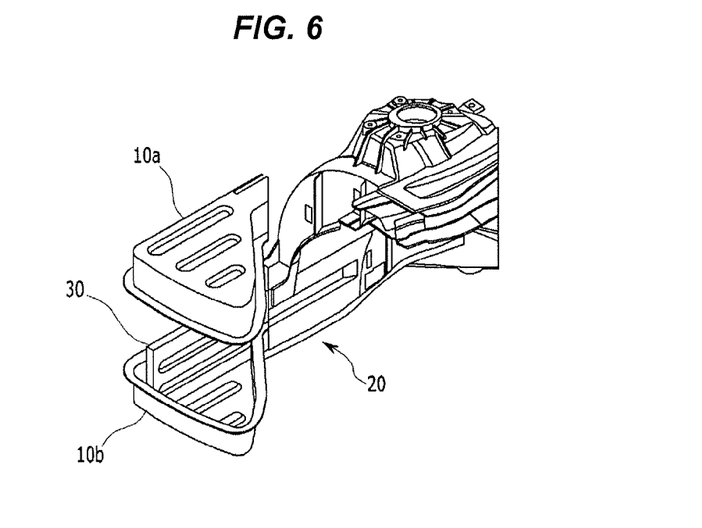
FIG. 6 is an exploded perspective view illustrating an appearance in which the exemplary front body member is mounted on the front side member according to the present invention.

FIG. 6 is an exploded perspective view illustrating an appearance in which the front body member according to various embodiments of the present invention is mounted on the front side member 20.

Figure 7A:
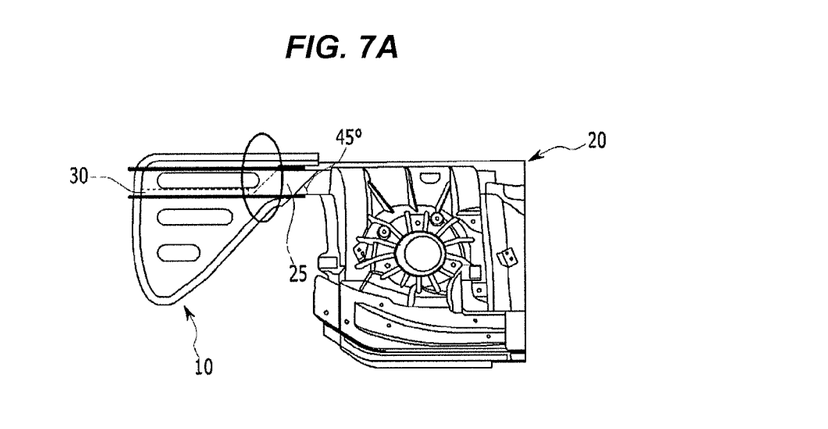
FIGS. 7A and 7B are a top plan view and an enlarged perspective view illustrating a position of a bulkhead of the exemplary front body member according to the present invention.
Figure 7B:
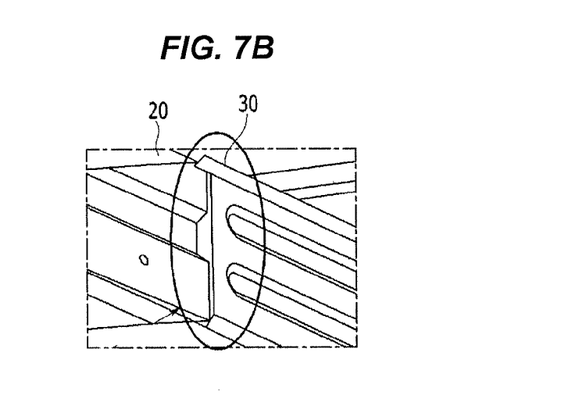

FIGS. 7A and 7B are a top plan view and an enlarged perspective view illustrating a position of the bulkhead of the front body member according to the present invention.

Referring to FIGS. 6, 7A and 7B, the bulkhead 30 vertically stands in the internal space of the front body member 10, and is formed so that three edges of the bulkhead 30 may be in contact with the inner surface of the front body member 10, and the remaining one edge may be positioned to be in contact with an edge in a height direction which corresponds to a front end in the length direction of the front side member 20.

In this case, the bulkhead 30 divides the internal space of the front body member 10 into two spaces in the vehicle width direction.

In various embodiments as illustrated in FIGS. 7A and 7B, an edge of the front end of the front side member 20, which is in contact with one edge of the bulkhead 30, is an edge in the height direction of a front end of an outer front side member 20b (see FIG. 9) which forms an outer portion of the front side member 20 in the vehicle width direction (Refer to the enlarged view).

Accordingly, the bulkhead 30 serves as an extended member of the outer front side member 20b.

Similarly, a surface, which is parallel with both the length direction and the height direction of the front side member 20 among surfaces that constitute the front body member 10, may serve as an extended member of an inner front side member 20a (see FIG. 9) which forms an inner portion of the front side member 20 in the vehicle width direction.

Therefore, the front body member 10 may be configured to be integrally formed and simultaneously function as an extended portion of the front side member 20.

Accordingly, in comparison with the front body member 1 in the related art, the normal tension load, which is applied to the spot weld at the time of a small overlap collision, is minimized, and a function of absorbing impact of the front side member 20 is maintained nearly as it is, thereby obtaining an effect of improving overall performance in transferring and absorbing collision energy.

FIGS. 7A and 7B illustrate a part of an engaging inner perimeter surface 25 which is a specific portion of an inner perimeter surface of the front body member 10 where the front body member 10 and a front portion of the front side member 20 overlap to be fixedly engaged.

The engaging inner perimeter surface 25 is the inner perimeter surface of the front body member 10 which overlaps the outer perimeter surface of the front portion of the front side member 20.

The engaging inner perimeter surface 25 may be formed by engaging the upper portion 10a and the lower portion 10b of the front body member.

One end of the engaging inner perimeter surface 25 may communicate with the internal space of the front body member 10, and the other end may communicate with an opening 15 (see FIG. 8) that is formed at one side of the front body member 10.

Figure 8:
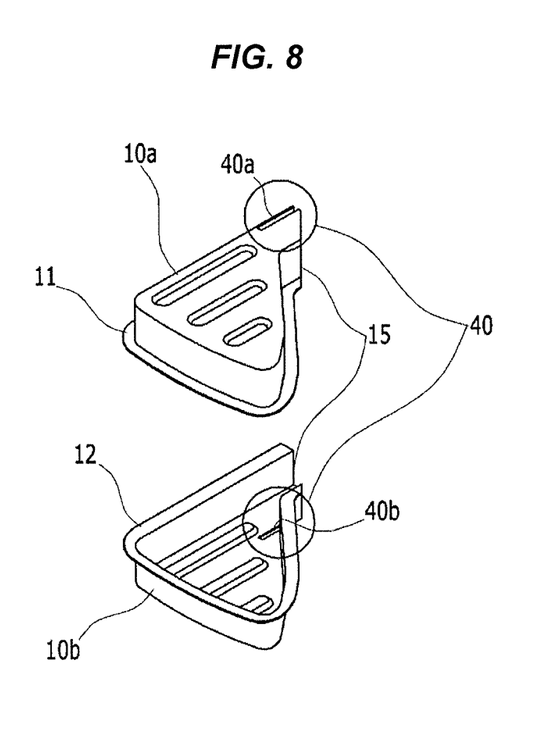
FIG. 8 is an exploded perspective view illustrating upper and lower portions of the exemplary front body member according to the present invention.

The opening 15 is an inlet into which the front portion of the front side member 20 is inserted to be fixedly engaged, and may be formed by engaging the upper portion 10a and the lower portion 10b of the front body member.

Referring to FIG. 7A, an engaging angle between a plane including the opening 15 and the length direction of the front side member 20 is indicated.

The engaging angle may be identical to an angle between a plane including an opened face of the front end of the front portion of the front side member 20 and the length direction of the front side member 20.

In this case, the angle may be a value between +45° and +135°, and in various embodiments illustrated in FIG. 7A, a case in which the angle is +45° is illustrated.

A predetermined length of the engaging inner perimeter surface 25 in the length direction of the front side member 20 needs to be assured in order to maintain connection stiffness.

Since the length of the engaging inner perimeter surface 25 means a length of an overlapping surface in the length direction of the front side member 20, the length of the engaging inner perimeter surface 25 may have a uniform value along a circumference of the engaging inner perimeter surface 25 even though the engaging angle, which is indicated in FIG. 7A, has any value.

The reason is that the engaging angle is an angle between the plane including the opening 15 and the length direction of the front side member 20, and a value of the engaging angle may be identical to an angle between the plane including the opened face of the front end of the front portion of the front side member 20 and the length direction of the front side member 20.

This can be easily understood when considering a case in which the engaging angle is +90°.

When it is assured that the length of the engaging inner perimeter surface 25 is 70 mm or more, sufficient connection stiffness is obtained.

FIG. 8 is an exploded perspective view illustrating the upper and lower portions of the front body member according to various embodiments of the present invention.

FIG. 8 illustrates the opening 15 and an engaging groove 40 of the front body member 10.

The opening 15 is an inlet portion of the front body member 10 which is formed so that the front portion of the front side member 20 can be inserted to the front body member 10 in order to be fixedly engaged.

In various embodiments as illustrated in FIG. 8, the opening 15 is formed by engaging the upper portion 10a and the lower portion 10b of the front body member.

This is identical to the forming of the engaging inner perimeter surface 25 that has been described in FIGS. 7A and 7B.

However, in case the front body member 10 is formed not by welding the upper flange 11 and the lower flange 12, the upper portion and the lower portion are not distinguished from each other, and the front body member 10 is integrally formed without a flange, the opening 15 may also be integrally formed.

A manufacturing method using 3D printing or casting may be the examples of the case above.

The engaging groove 40 is a groove which is formed in the vehicle length direction in at least one of the upper portion 10a and the lower portion 10b of the front body member so that at least one of an upper end protruding portion 21 (see FIG. 9) and a lower end protruding portion 22 (see FIG. 9), which may be formed to be extended in a length direction respectively on at least one of an upper end surface and a lower end surface of the front side member 20, may be fitted into the engaging groove 40 when the front body member 10 is inserted into the front side member 20 to be fixedly installed on the front side member 20.

Figure 9:
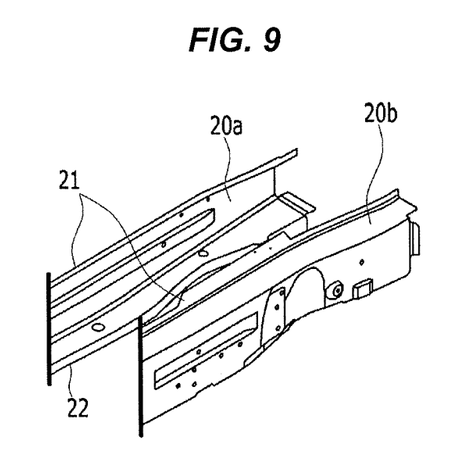
FIG. 9 is an exploded perspective view of the front side member on which the exemplary front body member is mounted according to the present invention.

The upper end protruding portion 21 and the lower end protruding portion 22 may comprise flanges which are formed in the length direction in order to couple an inner front side member 20a which forms an inner portion of the front side member 20 in the vehicle width direction and an outer front side member 20b which forms an outer portion of the front side member 20 in the vehicle width direction.

The engaging groove 40 may have a length that is identical to a length of the engaging inner perimeter surface 25 (see FIG. 7A) in the length direction of the front side member 20.

The reason is that the engaging inner perimeter surface 25 is a surface where the outer perimeter surface of the front portion of the front side member 20, which is inserted into the front body member 10 to be engaged, overlaps the inner surface inside the opening 15 of the front body member 10.

In various embodiments as illustrated in FIG. 8, the engaging groove 40 is formed in each of the upper portion 10a and the lower portion 10b correspondingly to the upper end protruding portion 21 and the lower end protruding portion 22 respectively.

FIG. 8 illustrates an upper engaging groove 40a and a lower engaging groove 40b.

FIG. 9 is an exploded perspective view of the front side member 20 on which the front body member 10 according to various embodiments of the present invention is mounted.

As described above, in various embodiments illustrated in FIG. 9, the upper end protruding portion 21 and the lower end protruding portion 22 are formed by flanges that are formed in the length direction respectively on the upper end surface and the lower end surface of the inner front side member 20a and the outer front side member 20b.

In FIG. 9, thick vertical lines at front ends of the inner front side member 20a and the outer front side member 20b of the front side member are provided to indicate a state in which the front side member 20 is vertically cut from the upper end surface to the lower end surface so that the engaging angle indicated in FIG. 7A may be +45°.

The front side member 20, which is manufactured in advance and cut by a plane that forms an angle of 45° with the vehicle length direction and the vehicle width direction, may be applied to the exemplary embodiment of the present invention, but it is apparent that the front side member 20 may be formed to have an engaging angle of +45° when the front side member 20 is initially manufactured.

In FIG. 9, the cut surface is shown as rectilinear lines, but it is apparent that according to a cross section in the vehicle width direction of the inner front side member 20a or the outer front side member 20b of the front side member, upper and lower surfaces in the height direction and an inner surface or an outer surface of the front side member in the vehicle width direction are bent to form about 90°.

The reason why the cut surface is shown as the rectilinear lines is that FIG. 9 is a perspective view that is viewed in a direction forming 45° with respect to all of three axes, the vehicle length direction, the vehicle width direction, and the vehicle height direction, in a state in which the engaging angle is +45° by cutting the front side member 20 with a plane that forms 45° with respect to both the vehicle length direction and the vehicle width direction.

Figure 10A:
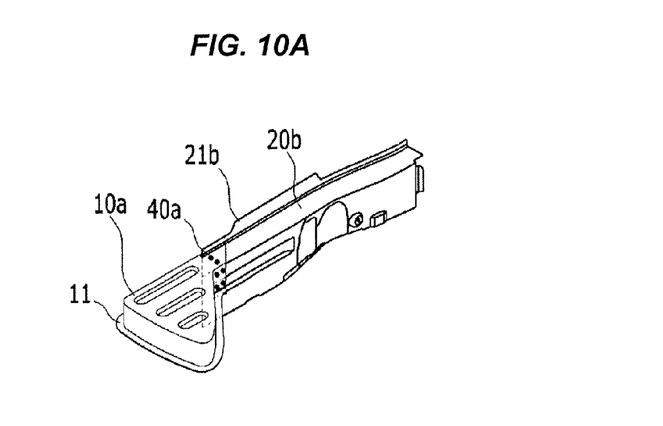
FIGS. 10A, 10B and 10C are an exploded perspective view illustrating a method of assembling the exemplary front body member according to the present invention.
Figure 10B:
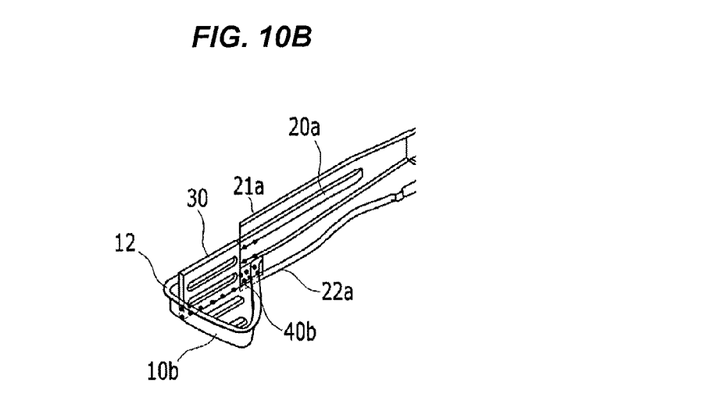
Figure 10C:
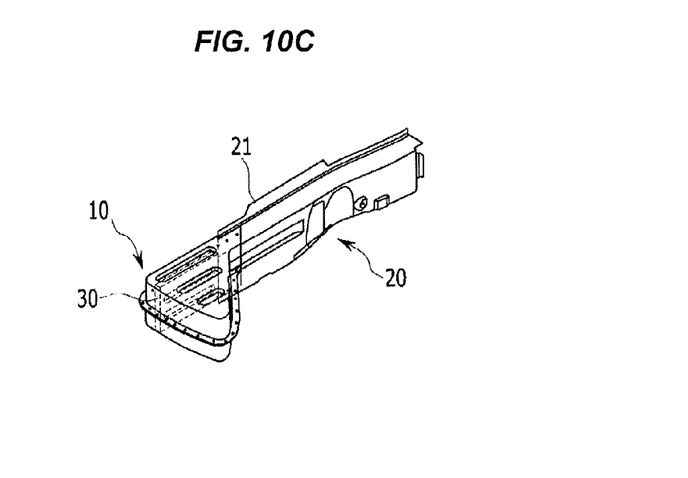

FIG. 10 is an exploded perspective view illustrating various embodiments of a method of assembling the front body member of the present invention.

However, the present invention is not limited to the exemplary embodiment illustrated in FIG. 10.

As illustrated in FIG. 10A, the upper portion 10a of the front body member 10 is first engaged with the outer front side member 20b, and in this case, the upper end protruding portion 21b of the outer front side member 20b is fitted into the upper engaging groove 40a.

The two parts are fixedly engaged by performing spot welding on portions indicated by black spots.

Next, as illustrated in FIG. 10B, the lower portion 10b of the front body member 10 is engaged with the inner front side member 20a.

The lower end protruding portion 22a of the inner front side member 20a is fitted into the lower engaging groove 40b.

In this case, the bulkhead 30 vertically stands in the empty space of the lower portion 10b of the front body member, and is placed at a predetermined position in the vehicle width direction so that the right edge in the height direction of the bulkhead 30 may thereafter come into contact with the edge in the height direction of the front end of the outer front side member 20b.

The three parts are fixedly engaged by performing spot welding on portions indicated by black spots.

Finally, as illustrated in FIG. 10C, the two assembled parts illustrated in FIGS. 10A and 10B are engaged while facing each other so that the upper portion 10a and the lower portion 10b of the front body member are in surface-to-surface contact with each other.

In this case, the upper end protruding portion 21b of the outer front side member 20b and the upper end protruding portion 21a of the inner front side member 20a are together fitted into the upper engaging groove 40a, and come into surface-to-surface contact with each other, thereby forming the upper end protruding portion 21.

The lower end protruding portion 22a of the inner front side member 20a and a lower end protruding portion of the outer front side member 20b are together fitted into the lower engaging groove 40b, and come into surface-to-surface contact with each other, thereby forming the lower end protruding portion 22.

Before the part illustrated in FIG. 10A and the part illustrated in FIG. 10B are engaged, a structural adhesive may be applied in advance onto a portion of an upper edge or a left edge in the height direction of the bulkhead 30, which will be in contact with the upper portion 10a of the front body member.

Alternatively, after the part illustrated in FIG. 10A and the part illustrated in FIG. 10B are engaged, corresponding parts may be fixedly engaged by laser welding.

In contrast, in case the bulkhead 30 is fixedly installed at a predetermined position in the vehicle width direction of the upper portion 10a of the front body member of FIG. 10A, a corresponding portion, where the structural adhesive is applied or the laser welding is performed, may be changed depending on the situation.

That is, the structural adhesive or the laser welding is applied to an edge portion, among the edges of the bulkhead 30, which will be in contact with the lower portion 10b of the front body member.

As illustrated in FIG. 10C, welding is performed on portions indicated by black spots of a contact surface where the upper flange 11 and the lower flange 12 are in contact with each other, and as a result, the front body member 10 according to the exemplary embodiment of the present invention may be integrally formed.

In addition, welding is also performed on the upper end protruding portion 21 and the lower end protruding portion, and as a result, the front side member 20 may be formed.

However, the various embodiments of the present invention are not limited to the assembly sequence and the assembly method above.

In case the front body member 10 according to the exemplary embodiment of the present invention is integrally manufactured by 3D printing or casting, the bulkhead 30 may be integrally formed at a position at which the bulkhead 30 may serve as the extended portion of the outer front side member 20b, unlike the configuration illustrated in FIG. 10B.

An external shape of the front body member 10 may be the same as those in FIGS. 3, 4 and 10.

The feature of the external shape will be described below.

When the front body member 10 is engaged with the front portion of the front side member 20, the front body member 10 may have a parallel face that is parallel with the length direction and the height direction of the front side member 20.

The parallel face may serve as an extended surface of the inner front side member 20a or the outer front side member 20b.

In addition, the front body member 10 may further include a vertical face which is perpendicular to the parallel face, and a diagonal face which is inclined while forming predetermined angles with respect to the parallel face and the vertical face.

The vertical face forms a front face portion that serves to increase an overlapped face with a collision body at the time of a small overlap collision.

Further, two cover faces, which are perpendicular to the three faces, that is, the parallel face, the vertical face, and the diagonal face, may be provided.

The two cover faces may be formed in the vehicle height direction on the upper portion and the lower portion.

The description regarding the external shape is described by generalizing the external shape of the front body member 10 illustrated in FIGS. 3, 4 and 10, but the external shape is not limited to the exemplary embodiment illustrated in the drawings.

The front body member 10 includes the parallel face, the vertical face, the diagonal face, and the cover faces, and may be formed in various shapes as long as the entire portions except for the opening 15 are closed.

In addition, the diagonal face and the vertical face may be formed outside the front side member 20 in the vehicle width direction.

In this case, an ability of to transfer collision energy of the front body member 10 and an ability to absorb collision energy of the front side member 20 are improved at the time of a small overlap collision.

In addition, shapes of the upper portion 10a and the lower portion 10b of the front body member may be formed to be symmetrical to each other.

In this case, the front body member 10 is vertically symmetric with respect to contact surface of the upper flange 11 and the lower flange 12.

Of course, in case the front body member 10 is formed by 3D printing or casting, the front body member 10 may be formed to be vertically symmetric without the flanges.

The engaging inner perimeter surface 25 and the outer perimeter surface of the front portion of the front side member 20 are welded, such that the front body member 10 may be fixedly engaged with the front side member 20.

This configuration is illustrated in FIGS. 7A, 10A and 10B.

However, the fixing and engaging method is not limited thereto, and in case the front body member 10 is integrally formed by 3D printing or casting, the front body member 10 may be fixedly engaged by a method other than welding.

In order to achieve the object of the present invention, strength of a material of the front body member 10 may be equal to or greater than strength of a material of the front side member 20.

The reason is that the front body member 10 not only serves to perform the function of the front body member 1 in the related art, but also serves as the extended portion of the front side member 20.

As described above, according to the present invention, the first distinguishing effect is that spot weld peel resistance is superbly improved at the time of a collision, thereby solving the problem that the front body member is first torn away or a part of the front body member is first fractured, and the second distinguishing effect is that the function of the front body member is stably performed in various collision situations by the integrated structure.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A front body member installed on a front portion of a front side member forming a frame of a front side of a vehicle body in a length direction of the vehicle body, and configured to transfer collision energy to the front side member, or allow the collision energy to be absorbed by the front side member at a time of a vehicle collision, the front body member comprising:
   an upper portion and a lower portion with respect to a height direction of the vehicle body,
   wherein the upper portion and the lower portion of the front body member include an upper flange and a lower flange, respectively, which are formed along perimeters of the upper portion and the lower portion to be in surface-to-surface contact with each other, wherein an empty space is formed in each of the upper portion and the lower portion of the front body member for a target internal space to be formed in the front body member when the upper flange and the lower flange are in surface-to-surface contact with each other, and wherein the upper portion and the lower portion of the front body member together form an opening into which the front portion of the front side member is inserted and an engaging inner perimeter surface on the front body member which overlaps an outer perimeter surface of the front portion of the front side member inside the opening, in a state in which the upper flange and the lower flange are in contact with each other.

2. The front body member of claim 1, wherein shapes of the upper portion and the lower portion of the front body member are symmetrical to each other with respect to a contact surface of the upper flange and the lower flange.

3. The front body member of claim 1, wherein a length of the engaging inner perimeter surface is 70 mm or more in a length direction of the front side member.

4. The front body member of claim 1, wherein the front body member further includes at least one bulkhead, and the at least one bulkhead is fixedly installed in the target internal space to serve as a reinforcement member.

5. The front body member of claim 4, wherein the front side member comprises:
an outer front side member forming an outer portion of the front side member in a vehicle width direction; and
an inner front side member forming an inner portion of the front side member in the vehicle width direction,
wherein the at least one bulkhead is formed to divide the target internal space into two spaces in the vehicle width direction while being in contact with a front end of the outer front side member or the inner front side member.

6. The front body member of claim 5, wherein a first portion of the at least one bulkhead which is in contact with either one of the upper portion or the lower portion of the front body member is fixedly installed by a structural adhesive or laser welding, and a second portion of the bulkhead which is in contact with the either one of the upper portion or the lower portion of the front body member that is not in contact with the first portion of the at least one bulkhead, is fixedly installed by spot welding.

7. The front body member of claim 1, wherein the front body member is integrally formed by welding the upper flange to the lower flange.

8. The front body member of claim 1,
wherein when the front body member is engaged with the front portion of the front side member, the front body member is formed to have a parallel face which is parallel with the length direction and a height direction of the front side member, a vertical face which is perpendicular to the parallel face, a diagonal face which forms predetermined angles with respect to the parallel face and the vertical face, and upper and lower cover faces in the vehicle height direction which are perpendicular to the vertical, parallel and diagonal faces.

9. The front body member of claim 8, wherein the diagonal face and the vertical face are formed outside the front side member in the vehicle width direction.

10. The front body member of claim 1, wherein the front body member is fixedly engaged with the front side member by welding the engaging inner perimeter surface and an outer perimeter surface of the front portion of the front side member.

11. The front body member of claim 1, wherein a plane including the opening forms an angle identical to an angle that is formed between a plane including an opened face of a front end of the front portion of the front side member and the length direction of the front side member.

12. The front body member of claim 11, wherein an angle between the plane including the opening and the length direction of the front side member is between +45° and +135°.

13. The front body member of claim 1,
wherein the front side member includes an upper end protruding portion or a lower end protruding portion formed respectively on an upper end surface or a lower end surface of the front side member and extending in the length direction of the front side member, and
wherein at least one of an upper engaging groove and a lower engaging groove is formed in the vehicle length direction in the upper or lower portions respectively of the front body member so that at least one of the upper end protruding portion and the lower end protruding portion is fitted into the at least one of the upper engaging groove and the lower engaging groove respectively when the front body member is engaged with the front portion of the front side member.

14. A front body member which is installed on a front portion of a front side member forming a frame of a front side of a vehicle body in a length direction of the vehicle body, and configured to transfer collision energy to the front side member, or allow the collision energy to be absorbed by the front side member at a time of a vehicle collision,
wherein the front body member is integrally formed to have a target internal space,
wherein when the front body member is engaged with the front portion of the front side member, the front body member is formed to have a parallel face which is parallel with a length direction and a height direction of the front side member, a vertical face which is perpendicular to the parallel face, a diagonal face which forms predetermined angles with respect to the parallel face and the vertical face, and upper and lower cover faces in a vehicle height direction which are perpendicular to the parallel face, the vertical face, and the diagonal face, and
wherein the front body member is integrally formed with an opening into which the front portion of the front side member is inserted, and an engaging inner perimeter surface which overlaps an outer perimeter surface of the front portion of the front side member inside the opening.

15. The front body member of claim 14, wherein the front body member further includes at least one bulkhead, and
the at least one bulkhead is integrally formed at a predetermined position in the internal space to serve as a reinforcement member.

16. The front body member of claim 15, wherein the front side member includes an outer front side member which forms an outer portion in a vehicle width direction, and an inner front side member which forms an inner portion in the vehicle width direction, and
the at least one bulkhead is formed to divide the internal space into two spaces in the vehicle width direction while being in contact with a front end of the outer front side member or the inner front side member.

17. The front body member of claim 14, wherein the diagonal face and the vertical face are formed outside the front side member in the vehicle width direction.

18. The front body member of claim 14, wherein the front side member includes an upper end protruding portion or a lower end protruding portion which is formed respectively on an upper end surface or a lower end surface of the front side member to be extended in a length direction, and at least one of an upper engaging groove and a lower engaging groove is formed in the vehicle length direction in the upper end portion or the lower end portion respectively in the vehicle height direction of the front body member so that at least one of the upper end protruding portion and the lower end protruding portion is fitted into the at least one of the upper engaging groove and the lower engaging groove respectively when the front body member is engaged with the front portion of the front side member.

* * * * *